United States Patent
Xu et al.

(10) Patent No.: US 10,070,430 B2
(45) Date of Patent: Sep. 4, 2018

(54) METHOD FOR CONFIGURING RESOURCE TO DATA RADIO BEARER DRB, AND APPARATUS

(71) Applicant: HUAWEI TECHNOLOGIES CO., LTD., Shenzhen, Guangdong (CN)

(72) Inventors: Xiuqiang Xu, Shanghai (CN); Yiqun Wu, Shanghai (CN); Shunqing Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 14/955,285

(22) Filed: Dec. 1, 2015

(65) Prior Publication Data
US 2016/0081081 A1    Mar. 17, 2016

Related U.S. Application Data

(63) Continuation of application No. PCT/CN2014/072420, filed on Feb. 22, 2014.

(30) Foreign Application Priority Data

Jun. 9, 2013  (CN) .......................... 2013 1 0231023

(51) Int. Cl.
H04W 4/00      (2018.01)
H04W 72/04     (2009.01)
H04W 88/08     (2009.01)

(52) U.S. Cl.
CPC ........ H04W 72/0426 (2013.01); H04W 88/08 (2013.01)

(58) Field of Classification Search
None
See application file for complete search history.

(56) References Cited

U.S. PATENT DOCUMENTS

2009/0262682 A1*  10/2009  Khetawat .............. H04W 12/08
                                                    370/328
2010/0103862 A1    4/2010  Ulupinar et al.
(Continued)

FOREIGN PATENT DOCUMENTS

CN     101500246 A    8/2009
CN     102724759 A    10/2012
(Continued)

OTHER PUBLICATIONS

Xiuqiang Xu et al: "On Functionality Separation for Green Mobile Networks: Concept Study over LTE", Heterogeneous and small cell networks, May 2013, total 9 pages.
(Continued)

*Primary Examiner* — Zewdu A Beyen
(74) *Attorney, Agent, or Firm* — Huawei Technologies Co., Ltd.

(57) ABSTRACT

The present disclosure relates to the field of mobile communications technologies, and discloses a method for configuring a resource to a DRB, and an apparatus. The method is specifically: first determining, by a first CBS, resource configuration information used by a first DBS to separately allocate a resource to at least one DRB of UE; and then, sending, to the first DBS, a first resource allocation indication that carries the determined resource configuration information, so that the first DBS separately allocates the resource to the at least one DRB of the UE according to the resource configuration information. In this way, effectively implementing resource configuration for a protocol entity in a DBS according to a QoS requirement of a DRB.

25 Claims, 10 Drawing Sheets

(56) References Cited

U.S. PATENT DOCUMENTS

| | | |
|---|---|---|
| 2010/0103863 A1 | 4/2010 | Ulupinar et al. |
| 2010/0165953 A1* | 7/2010 | Chen .................. H04W 72/1273 370/335 |
| 2011/0009124 A1 | 1/2011 | Kostic |
| 2011/0136496 A1 | 6/2011 | Klang et al. |
| 2011/0189944 A1* | 8/2011 | Wang ..................... H04B 7/155 455/7 |
| 2011/0228719 A1* | 9/2011 | Liu .................... H04B 7/15542 370/315 |
| 2011/0274030 A1* | 11/2011 | Wang ..................... H04W 76/02 370/315 |
| 2013/0044708 A1* | 2/2013 | Kim ........................ H04W 4/06 370/329 |
| 2014/0087731 A1 | 3/2014 | Zhang et al. |
| 2014/0128092 A1 | 5/2014 | Xiong et al. |

FOREIGN PATENT DOCUMENTS

| | | |
|---|---|---|
| CN | 102802220 A | 11/2012 |
| CN | 102833802 A | 12/2012 |
| CN | 102883440 A | 1/2013 |
| EP | 2713650 A1 | 4/2014 |
| EP | 2838299 A1 | 2/2015 |
| EP | 2887735 A1 | 6/2015 |
| RU | 2378762 C2 | 1/2010 |
| WO | 2013010418 A1 | 1/2013 |

OTHER PUBLICATIONS

"3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP TR 36.806 V9.0.0, Mar. 2010, total 34 pages.

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842 V0.2.0, May 2013, total 38 pages.

Hiroyuki Ishii et al: "A novel architecture for LTE-B :C-plane/U-plane split and Phantom Cell concept", 2012 IEEE globecom workshops, Dec. 3, 2012, total 8 pages.

CATT: "Evaluation on the mobility enhancement", 3GPP TSG RAN WG2 meeting, R2-130116; Jan. 18, 2013, total 4 pages.

* cited by examiner

METHOD FOR CONFIGURING RESOURCE TO DATA RADIO BEARER DRB, AND APPARATUS

CROSS-REFERENCE TO RELATED APPLICATIONS

This application is a continuation of International Application No. PCT/CN2014/072420, filed on Feb. 22, 2014, which claims priority to Chinese Patent Application No. 201310231023.9, filed on Jun. 9, 2013, both of which are hereby incorporated by reference in their entireties.

TECHNICAL FIELD

The present disclosure relates to the field of mobile communications technologies, and in particular, to a method for configuring a resource to a data radio bearer (DRB), and an apparatus.

BACKGROUND

Because a data/signaling separation network can effectively improve network capacity and reduce network signaling overheads, the data/signaling separation network is an important direction towards which a wireless network evolves in future, where data/signaling separation refers to separation of a control plane (CP) from a user plane (UP). Compared with a traditional cellular network, a most important characteristic of the data/signaling separation network is that a traditional base station (BS) or an Evolved NodeB (eNB) is physically divided into two parts: a control base station (CBS) and a data base station (DBS). In an architecture of a data/signaling separation network, a user with a low moving speed that is located in coverage of a DBS and has a relatively high requirement for a data rate simultaneously receives signals from a CBS and the DBS. Referring to FIG. 1A, a CBS is configured to control control-plane transmission of a user, for example, to transmit higher layer control information which is used to manage an radio resource control (RRC) connection, maintain a radio bearer, manage context information, and the like, and a DBS is configured to control user-plane transmission of a user, for example, to transmit user data generated by various applications.

In the architecture of the data/signaling separation network, for example, the CBS is connected to a core network by using an S1+ interface, and is configured to exchange control-plane signaling and user-plane data with a core network entity (for example, a mobility management entity and a serving gateway (S-GW) in LTE); the CBS is connected to the DBS by using an X2+ interface which is used to transmit data on the user plane and signaling on the control plane; and both the CBS and the DBS are connected to a UE by using an air interface which is used to transmit the data on the user plane.

After any user equipment (UE) accesses a wireless network and establishes a connection to an eNB, multiple radio bearers are established between the eNB and the UE. According to specific functions of radio bearers, radio bearers may be classified into a DRB (data radio bearer) and an SRB (signaling radio bearer). The DRB indicates a data bearer between a UE and a wireless network, where based on the data bearer, a core network may provide a service for the UE. The SRB indicates a signaling bearer between an eNB and a UE, where based on the signaling bearer, the eNB may control a connection between the UE and the wireless network and schedule a radio resource.

In the prior art, user-plane data of a user is transmitted by using a DRB between a base station and the user. The DRB is the general term of a series of protocol entities and configurations, is managed on a control plane of the base station, and includes a PDCP (Packet Data Convergence Protocol) entity, an RLC (Radio Link Control) protocol entity, a MAC (Medium Access Control) protocol entity, configuration information of these protocol entities, a parameter configuration of a PHY (physical layer), and the like, where generally, the PDCP, the RLC, and the MAC are collectively referred to as Layer 2, and the physical layer is referred to as Layer 1. Configuration parameters of these protocol entities are determined by the base station according to a QoS (quality of service) parameter corresponding to the DRB. A downlink transmission process of the user-plane data is as follows: The base station receives user data from a core network, sequentially processes the received user data at PDCP, RLC, MAC, and PHY sublayers, and then sends the processed user data to the user by using an air interface. An uplink transmission process is reverse to the foregoing process.

In the prior art, in an architecture of a data/signaling separation network, protocol entities or sublayers, corresponding to a DRB, at Layer 1 and Layer 2 on a user plane need to be allocated to a CBS and a DBS according to the following rule: The CBS includes some protocol entities at Layer 2 and implements functions of Layer 2, and the DBS includes remaining protocol entities at Layer 2 and a protocol entity at Layer 1 (that is, a physical layer), and implements functions of other sublayers at Layer 2 and a function of the physical layer.

For example, referring to FIG. 1B, a CBS includes a PDCP protocol entity and implements a function of a PDCP sublayer, and a DBS includes an RLC protocol entity, a MAC protocol entity, and a PHY protocol entity, and implements functions of an RLC sublayer, a MAC sublayer, and a PHY sublayer. In an architecture of a user-plane protocol stack shown in FIG. 1B, a downlink transmission process of user-plane data is as follows: The CBS receives the data on the user plane from a core network, processes a data packet at the PDCP protocol sublayer, and forwards the processed data packet to the DBS by using an X2+ interface; the DBS processes the received user-plane data at the RLC protocol sublayer, the MAC protocol sublayer, and the PHY protocol sublayer, and then sends the processed data to a user by using an air interface. An uplink transmission process of the user-plane data is reverse to the downlink transmission process. It should be noted that FIG. 1B shows only one type of architecture of a user-plane protocol stack, and in an actual application, there are also multiple other types of architectures of a user-plane protocol stack. For example, as shown in FIG. 1C, a CBS includes a PDCP protocol entity and an RLC protocol entity, and a DBS includes a MAC protocol entity and a PHY protocol entity. For another example, as shown in FIG. 1D, a CBS includes a PDCP protocol entity, an RLC protocol entity, and a MAC protocol entity, and a DBS includes only a PHY protocol entity. Other types of architectures of a user-plane protocol stack are not described one by one in detail herein again.

It can be seen from the above that some protocol entities and some sublayer functions of a DRB are allocated to a DBS for implementation, and remaining protocol entities and remaining sublayer functions of the DRB are allocated to a CBS for implementation. Because the DBS does not have a function of a control plane, a data/signaling separation network can effectively run only after resource configuration is performed for a protocol entity in the DBS according to a QoS requirement of a DRB. Therefore, performing resource configuration for a protocol entity in a DBS according to a QoS requirement of a DRB is a key technology for effective running of a data/signaling separation network. However, currently, there is yet no effective solution of performing resource configuration for a protocol entity in a DBS according to a QoS requirement of a DRB.

SUMMARY

The present disclosure provides a method for configuring a resource for a data radio bearer (DRB), and an apparatus, which are used to provide an effective solution of configuring a resource for a protocol entity in a DBS according to a QoS requirement of a DRB.

According to a first aspect, a method for configuring a resource for a data radio bearer (DRB) is provided, including:

determining, by a first control base station (CBS), resource configuration information used by a first data base station (DBS) to separately allocate a resource to at least one data radio bearer (DRB) of user equipment (UE); and adding the resource configuration information to a first resource allocation indication, and sending the first resource allocation indication to the first DBS, so that the first DBS separately allocates the resource to the at least one DRB of the UE according to the resource configuration information.

With reference to the first aspect, in a first possible implementation manner, the resource configuration information includes at least one of the following: identifier information of the UE, DRB identifier information separately corresponding to the at least one DRB of the UE, and interface resource information corresponding to each piece of DRB identifier information.

With reference to the first aspect, in a second possible implementation manner, the method further includes: receiving, by the first CBS, a first resource configuration response message that is fed back by the first DBS after the first DBS completes resource configuration according to the resource configuration information.

With reference to the second possible implementation manner of the first aspect, in a third possible implementation manner, the first resource configuration response message includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

With reference to the first or third possible implementation manner of the first aspect, in a fourth possible implementation manner, the interface resource information includes X2+ interface resource information and/or air interface resource information.

With reference to the first aspect, in a fifth possible implementation manner, the method further includes: sending, by the first CBS, a first resource release indication to the first DBS, so that the first DBS releases, for the UE according to at least one type of information of identifier information of the UE and at least one piece of DRB identifier information corresponding to a DRB having a resource to be released, the resource on the DRB corresponding to the at least one piece of DRB identifier information, where the first resource release indication carries at least one of the identifier information of the UE and the at least one piece of DRB identifier information corresponding to the DRB having the resource to be released.

With reference to the fifth possible implementation manner of the first aspect, in a sixth possible implementation manner, the method further includes: sending, by the first CBS, a first radio resource control RRC reconfiguration instruction to the UE, so that the UE releases an air interface resource of the DRB corresponding to the at least one piece of DRB identifier information.

With reference to the first aspect, in a seventh possible implementation manner, the method further includes:

sending, by the first CBS, a second resource allocation indication to the second DBS, so that the second DBS separately allocates a resource to the at least one DRB of the UE; and after the first CBS receives a second resource configuration response message that is returned by the second DBS after the second DBS allocates the resource to the at least one DRB of the UE, sending, by the first CBS, a second RRC reconfiguration instruction to the UE, so that the UE switches from the first DBS to the second DBS.

With reference to the seventh possible implementation manner of the first aspect, in an eighth possible implementation manner, the second RRC reconfiguration instruction includes frequency information and/or pilot information that are/is used by the second DBS.

With reference to the seventh or eighth possible implementation manner of the first aspect, in a ninth possible implementation manner, the method further includes: after the first CBS receives an RRC reconfiguration complete response message that is returned by the UE after the UE completes switching according to the second RRC reconfiguration instruction, sending, by the first CBS, a second resource release indication to the first DBS, so that the first DBS releases the resource separately allocated to the at least one DRB of the UE.

With reference to the first aspect, in a tenth possible implementation manner, the method further includes:

sending, by the first CBS, a switching indication to the second CBS, so that the second CBS separately allocates a resource to the at least one DRB of the UE; and after the first CBS receives a third resource configuration response message that is returned by the second CBS after the second CBS allocates the resource to the at least one DRB of the UE, sending, by the first CBS, a third RRC reconfiguration instruction to the UE, so that the UE switches from the first CBS to the second CBS.

With reference to the tenth possible implementation manner of the first aspect, in an eleventh possible implementation manner, the method further includes: receiving, by the first CBS, a third resource release indication that is sent by the second CBS after the UE switches from the first CBS to the second CBS, so that the first CBS releases the resource separately allocated to the at least one DRB of the UE.

According to a second aspect, a method for configuring a resource for a data radio bearer DRB is provided, including:

receiving, by a first data base station DBS, a resource allocation indication sent by a first control base station CBS, where the resource allocation indication carries resource configuration information determined by the first CBS and used by the first DBS to separately allocate a resource to at least one data radio bearer DRB of user equipment UE; and separately allocating, by the first DBS, the resource to the at least one DRB of the UE according to the resource configuration information.

With reference to the second aspect, in a first possible implementation manner, the resource configuration information includes at least one of the following: identifier information of the UE, DRB identifier information separately corresponding to the at least one DRB of the UE, and interface resource information corresponding to each piece of DRB identifier information.

With reference to the second aspect, in a second possible implementation manner, the method further includes: sending, by the first DBS to the first CBS, a resource configuration response message that is fed back after resource configuration is completed according to the resource configuration information.

With reference to the second possible implementation manner of the second aspect, in a third possible implementation manner, the resource configuration response message includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

With reference to the first or third possible implementation manner of the second aspect, in a fourth possible implementation manner, the interface resource information includes X2+ interface resource information and/or air interface resource information.

With reference to the second aspect, in a fifth possible implementation manner, the method further includes: receiving, by the first DBS, a first resource release indication sent by the first CBS, and releasing, for the UE according to identifier information of the UE and/or at least one piece of DRB identifier information corresponding to a DRB having a resource to be released, the resource on the DRB corresponding to the at least one piece of DRB identifier information, where the first resource release indication carries at least the identifier information of the UE and/or the at least one piece of DRB identifier information corresponding to the DRB having the resource to be released.

With reference to the second aspect, in a sixth possible implementation manner, the method further includes: receiving, by the first DBS, a second resource release indication that is sent by the first CBS after the UE completes switching and returns an RRC reconfiguration complete response message, and releasing, according to the second resource release indication, the resource separately allocated to the at least one DRB of the UE.

According to a third aspect, a control base station CBS is provided, including:

a determining unit, configured to determine resource configuration information used by a first data base station DBS to separately allocate a resource to at least one data radio bearer DRB of user equipment UE; and a sending unit, configured to add the resource configuration information to a first resource allocation indication, and send the first resource allocation indication to the first DBS, so that the first DBS separately allocates the resource to the at least one DRB of the UE according to the resource configuration information.

With reference to the third aspect, in a first possible implementation manner, the resource configuration information determined by the determining unit includes at least one of the following: identifier information of the UE, DRB identifier information separately corresponding to the at least one DRB of the UE, and interface resource information corresponding to each piece of DRB identifier information.

With reference to the third aspect, in a second possible implementation manner, the CBS further includes: a receiving unit, configured to receive a first resource configuration response message that is fed back by the first DBS after the first DBS completes resource configuration according to the resource configuration information.

With reference to the second possible implementation manner of the third aspect, in a third possible implementation manner, the first resource configuration response message received by the receiving unit includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

With reference to the first or third possible implementation manner of the third aspect, in a fourth possible implementation manner, the interface resource information included in the resource configuration information determined by the determining unit includes X2+ interface resource information and/or air interface resource information.

With reference to the third aspect, in a fifth possible implementation manner, the sending unit is further configured to send a first resource release indication to the first DBS, so that the first DBS releases, for the UE according to identifier information of the UE and/or at least one piece of DRB identifier information corresponding to a DRB having a resource to be released, the resource on the DRB corresponding to the at least one piece of DRB identifier information, where the first resource release indication carries at least the identifier information of the UE and/or the at least one piece of DRB identifier information corresponding to the DRB having the resource to be released.

With reference to the fifth possible implementation manner of the third aspect, in a sixth possible implementation manner, the sending unit is further configured to send a first radio resource control RRC reconfiguration instruction to the UE, so that the UE releases an air interface resource of the DRB corresponding to the at least one piece of DRB identifier information.

With reference to the third aspect, in a seventh possible implementation manner, the sending unit is further configured to send a second resource allocation indication to the second DBS, so that the second DBS separately allocates a resource to the at least one DRB of the UE; and after a second resource configuration response message that is returned by the second DBS after the second DBS allocates the resource to the at least one DRB of the UE is received, send a second RRC reconfiguration instruction to the UE, so that the UE switches from the first DBS to the second DBS.

With reference to the seventh possible implementation manner of the third aspect, in an eighth possible implementation manner, the second RRC reconfiguration instruction sent by the sending unit includes frequency information and/or pilot information that are/is used by the second DBS.

With reference to the seventh or eighth possible implementation manner of the third aspect, in a ninth possible implementation manner, the sending unit is further configured to send a second resource release indication to the first DBS, so that the first DBS releases the resource separately allocated to the at least one DRB of the UE.

With reference to the third aspect, in a tenth possible implementation manner, the sending unit is further configured to send a switching indication to the another CBS, so that the another CBS separately allocates a resource to the at least one DRB of the UE; and after a third resource configuration response message that is returned by the another CBS after the another CBS allocates the resource to the at least one DRB of the UE is received, send a third RRC reconfiguration instruction to the UE, so that the UE switches from the current CBS to the another CBS.

With reference to the tenth possible implementation manner of the third aspect, in an eleventh possible implementation manner, the determining unit is further configured to: after a third resource release indication sent by the another CBS is received, instruct the current CBS to release the resource separately allocated to the at least one DRB of the UE.

According to a fourth aspect, a data base station DBS is provided, including:

a receiving unit, configured to receive a resource allocation indication sent by a first control base station CBS, where the resource allocation indication carries resource configuration information determined by the first CBS and used by the DBS to separately allocate a resource to at least one data radio bearer DRB of user equipment UE; and a resource allocation unit, configured to separately allocate the resource to the at least one DRB of the UE according to the resource configuration information.

With reference to the fourth aspect, in a first possible implementation manner, the resource configuration information received by the receiving unit includes at least one of the following: identifier information of the UE, DRB identifier information separately corresponding to the at least one DRB of the UE, and interface resource information corresponding to each piece of DRB identifier information.

With reference to the fourth aspect, in a second possible implementation manner, the DBS further includes: a feedback unit, configured to send, to the first CBS, a resource configuration response message that is fed back after resource configuration is completed according to the resource configuration information.

With reference to the second possible implementation manner of the fourth aspect, in a third possible implementation manner, the resource configuration response message fed back by the feedback unit includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

With reference to the first or third possible implementation manner of the fourth aspect, in a fourth possible implementation manner, the interface resource information in the resource configuration information received by the receiving unit includes X2+ interface resource information and/or air interface resource information.

With reference to the fourth aspect, in a fifth possible implementation manner, the resource allocation unit is further configured to:

release, for the UE according to identifier information of the UE and/or at least one piece of DRB identifier information corresponding to a DRB having a resource to be released, the resource on the DRB corresponding to the at least one piece of DRB identifier information, where a first resource release indication carries at least the identifier information of the UE and/or the at least one piece of DRB identifier information corresponding to the DRB having the resource to be released.

With reference to the fourth aspect, in a sixth possible implementation manner, the resource allocation unit is further configured to:

after a second resource release indication that is sent by the first CBS after the UE completes switching and returns an RRC reconfiguration complete response message is received, release, according to the second resource release indication, the resource separately allocated to the at least one DRB of the UE.

According to a fifth aspect, a control base station CBS is provided, including:

a processor, configured to determine resource configuration information used by a first data base station DBS to separately allocate a resource to at least one data radio bearer DRB of user equipment UE; and a transmitter, configured to add the resource configuration information to a first resource allocation indication, and send the first resource allocation indication to the first DBS, so that the first DBS separately allocates the resource to the at least one DRB of the UE according to the resource configuration information.

With reference to the fifth aspect, in a first possible implementation manner, the resource configuration information determined by the processor includes at least one of the following: identifier information of the UE, DRB identifier information separately corresponding to the at least one DRB of the UE, and interface resource information corresponding to each piece of DRB identifier information.

With reference to the fifth aspect, in a second possible implementation manner, the CBS further includes: a receiver, configured to receive a first resource configuration response message that is fed back by the first DBS after the first DBS completes resource configuration according to the resource configuration information.

With reference to the second possible implementation manner of the fifth aspect, in a third possible implementation manner, the first resource configuration response message received by the receiver includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

With reference to the first or third possible implementation manner of the fifth aspect, in a fourth possible implementation manner, the interface resource information included in the resource configuration information determined by the processor includes at least X2+ interface resource information and/or air interface resource information.

With reference to the fifth aspect, in a fifth possible implementation manner, the transmitter is further configured to send a first resource release indication to the first DBS, so that the first DBS releases, for the UE according to identifier information of the UE and/or at least one piece of DRB identifier information corresponding to a DRB having a resource to be released, the resource on the DRB corresponding to the at least one piece of DRB identifier information, where the first resource release indication carries at least the identifier information of the UE and/or the at least one piece of DRB identifier information corresponding to the DRB having the resource to be released.

With reference to the fifth possible implementation manner of the fifth aspect, in a sixth possible implementation manner, the transmitter is further configured to send a first radio resource control RRC reconfiguration instruction to the UE, so that the UE releases an air interface resource of the DRB corresponding to the at least one piece of DRB identifier information.

With reference to the fifth aspect, in a seventh possible implementation manner, the transmitter is further configured to: send a second resource allocation indication to the second DBS, so that the second DBS separately allocates a resource to the at least one DRB of the UE; and after a second resource configuration response message that is returned by the second DBS after the second DBS allocates the resource to the at least one DRB of the UE is received, send a second RRC reconfiguration instruction to the UE, so that the UE switches from the first DBS to the second DBS.

With reference to the seventh possible implementation manner of the fifth aspect, in an eighth possible implementation manner, the second RRC reconfiguration instruction sent by the transmitter includes frequency information and/or pilot information that are/is used by the second DBS.

With reference to the seventh or eighth possible implementation manner of the fifth aspect, in a ninth possible implementation manner, the transmitter is further configured to: after an RRC reconfiguration complete response message that is returned by the UE after the UE completes switching according to the second RRC reconfiguration instruction is received, send a second resource release indication to the first DBS, so that the first DBS releases the resource separately allocated to the at least one DRB of the UE.

With reference to the fifth aspect, in a tenth possible implementation manner, the transmitter is further configured to: send a switching indication to the another CBS, so that the another CBS separately allocates a resource to the at least one DRB of the UE; and after a third resource configuration response message that is returned by the another CBS after the another CBS allocates the resource to the at least one DRB of the UE is received, send a third RRC reconfiguration instruction to the UE, so that the UE switches from the current CBS to the another CBS.

With reference to the tenth possible implementation manner of the fifth aspect, in an eleventh possible implementation manner, the processor is further configured to: after a third resource release indication sent by the another CBS is received, instruct the current CBS to release the resource separately allocated to the at least one DRB of the UE.

According to a sixth aspect, a data base station DBS is provided, including:

a receiver, configured to receive a resource allocation indication sent by a first control base station CBS, where the resource allocation indication carries resource configuration information determined by the first CBS and used by the DBS to separately allocate a resource to at least one data radio bearer DRB of user equipment UE; and a processor, configured to separately allocate the resource to the at least one DRB of the UE according to the resource configuration information.

With reference to the sixth aspect, in a first possible implementation manner, the resource configuration information received by the receiver includes at least one of the following: identifier information of the UE, DRB identifier information separately corresponding to the at least one DRB of the UE, and interface resource information corresponding to each piece of DRB identifier information.

With reference to the sixth aspect, in a second possible implementation manner, the DBS further includes: a transmitter, configured to send, to the first CBS, a resource configuration response message that is fed back after resource configuration is completed according to the resource configuration information.

With reference to the second possible implementation manner of the sixth aspect, in a third possible implementation manner, the resource configuration response message fed back by the transmitter includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

With reference to the first or third possible implementation manner of the sixth aspect, in a fourth possible implementation manner, the interface resource information in the resource configuration information received by the receiver includes X2+ interface resource information and/or air interface resource information.

With reference to the sixth aspect, in a fifth possible implementation manner, the processor is further configured to: after a first resource release indication sent by the first CBS is received, release, for the UE according to identifier information of the UE and/or at least one piece of DRB identifier information corresponding to a DRB having a resource to be released, the resource on the DRB corresponding to the at least one piece of DRB identifier information, where a first resource release indication carries at least the identifier information of the UE and/or the at least one piece of DRB identifier information corresponding to the DRB having the resource to be released.

With reference to the sixth aspect, in a sixth possible implementation manner, the processor is further configured to: after a second resource release indication that is sent by the first CBS after the UE completes switching and returns an RRC reconfiguration complete response message is received, release, by the processor according to the second resource release indication, the resource separately allocated to the at least one DRB of the UE.

The present disclosure provides a method for configuring a resource for a DRB, where a first CBS first determines resource configuration information used by a first DBS to separately allocate a resource to at least one DRB of a UE; and then adds the determined resource configuration information to a first resource allocation indication, and sends the first resource allocation indication to the first DBS, so that the first DBS separately allocates the resource to the at least one DRB of the UE according to the resource configuration information. In this way, a resource is effectively configured for a protocol entity in a DBS according to a QoS requirement of a DRB.

DESCRIPTION OF EMBODIMENTS

Figure 1A:
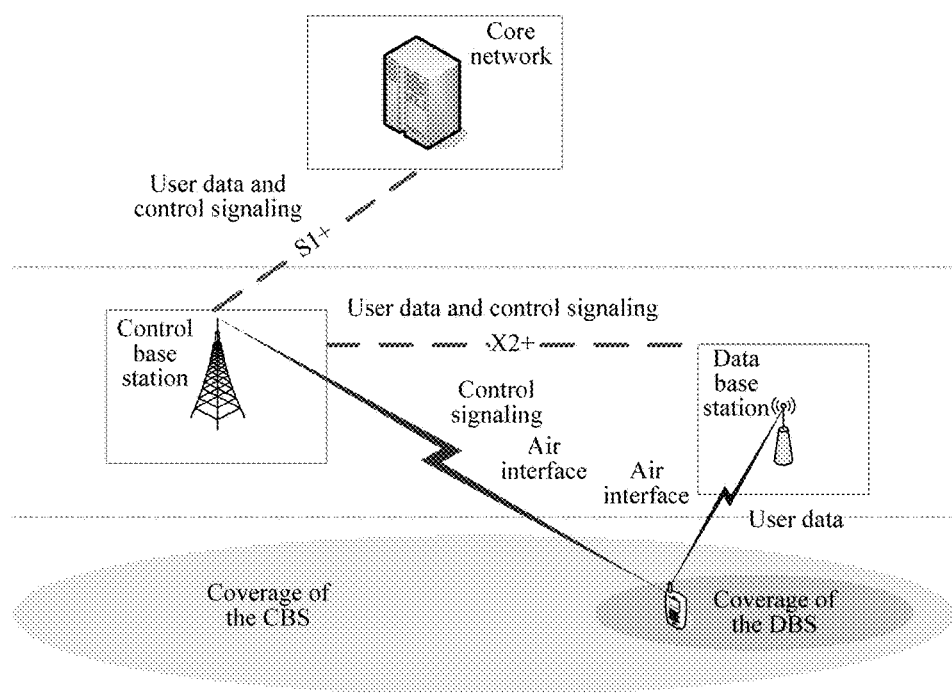
FIG. 1A is a schematic diagram of a data/signaling separation network in the prior art.
Figure 1B:
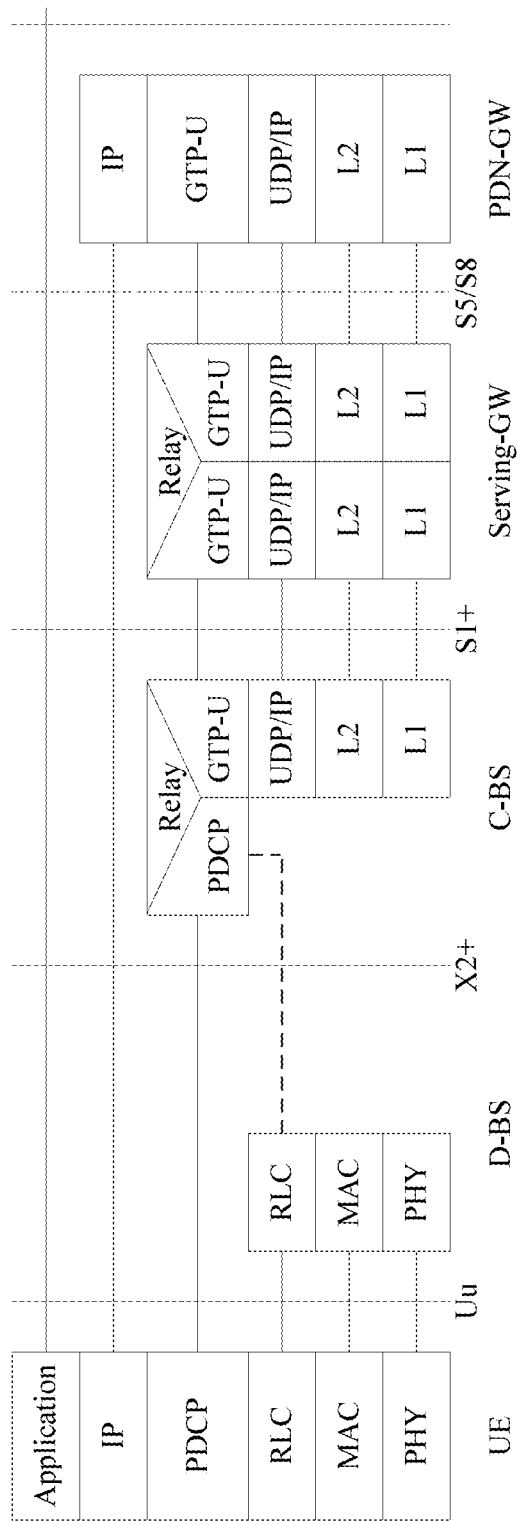
FIG. 1B is a first schematic diagram of an architecture of a user-plane protocol stack in an architecture of a data/signaling separation network in the prior art.
Figure 1C:
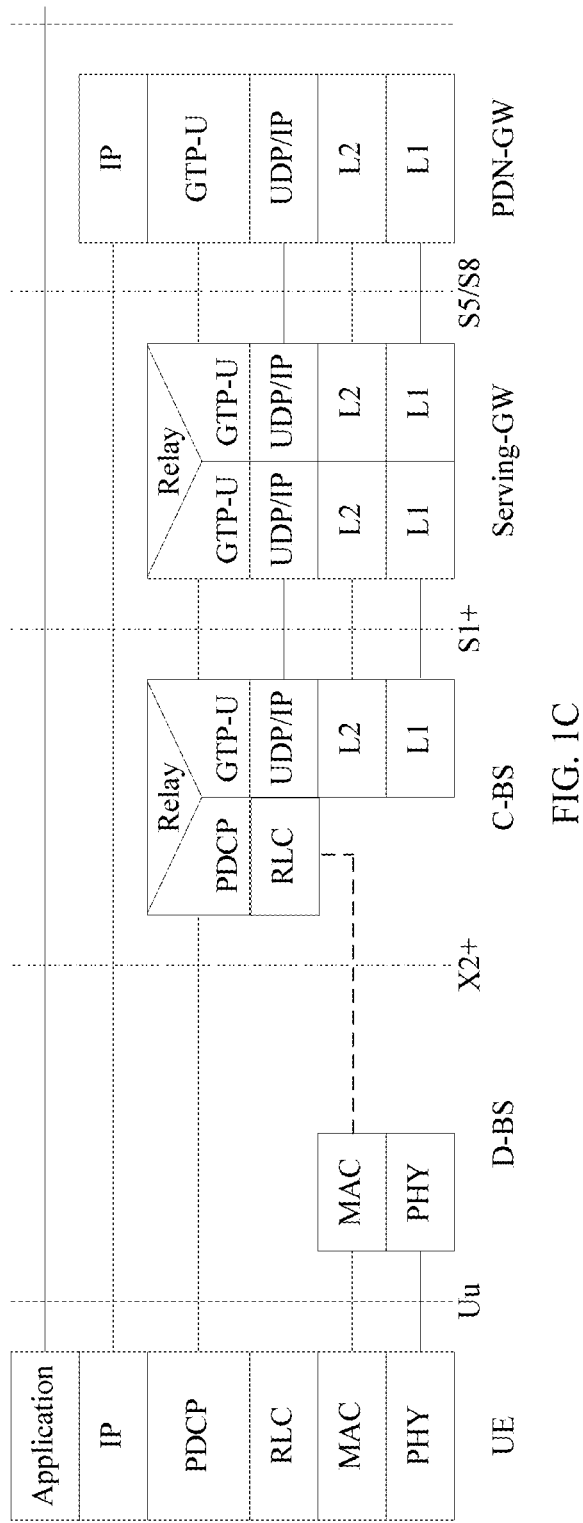
FIG. 1C is a second schematic diagram of an architecture of a user-plane protocol stack in an architecture of a data/signaling separation network in the prior art.
Figure 1D:
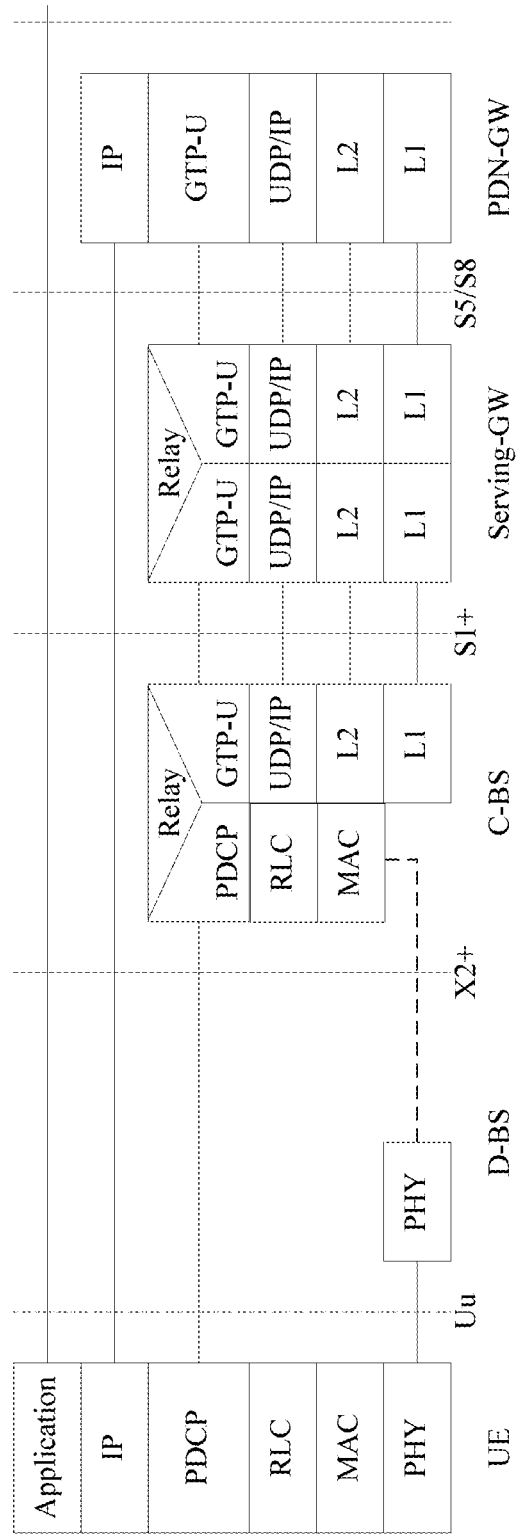
FIG. 1D is a third schematic diagram of an architecture of a user-plane protocol stack in an architecture of a data/signaling separation network in the prior art.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an or relationship between the associated objects.

In the embodiments of the present disclosure, in order to configure a resource for a protocol entity in a DBS according to a QoS requirement of a DRB, a first CBS first determines resource configuration information used by a first DBS to separately allocate a resource to at least one DRB of a UE, then adds the resource configuration information to a first resource allocation indication, and sends the first resource allocation indication to the first DBS; after receiving the first resource allocation indication, the first DBS separately allocates the resource to the at least one DRB of the UE according to the resource configuration information carried in the first resource allocation indication. In this way, even if the first DBS does not have a function of a control plane, the first DBS can still configure a resource for at least one protocol entity in a DBS according to the received first resource allocation indication sent by the first CBS, thereby effectively implementing resource configuration for a protocol entity in the DBS according to a QoS requirement of a DRB, and further implementing interaction between the first CBS and the first DBS and interaction between the first CBS and the corresponding UE.

The following describes optional implementation manners of the present disclosure in detail with reference to the accompanying drawings.

Figure 2:
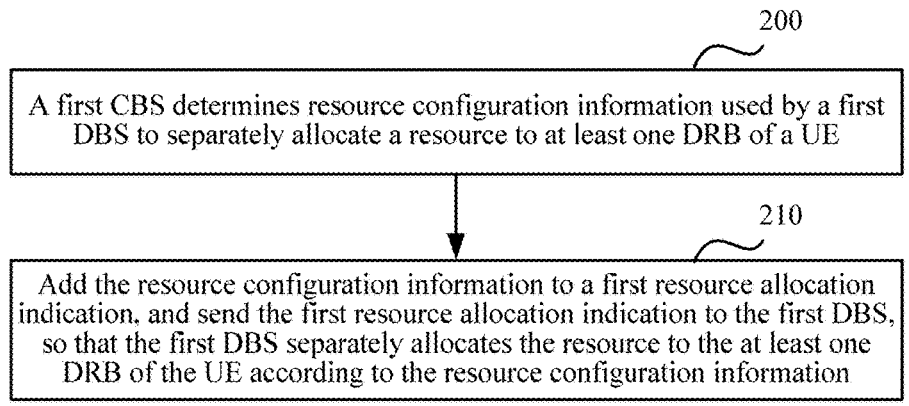
FIG. 2 is a first detailed schematic flowchart of configuring a resource for a DRB according to an embodiment of the present disclosure.

Referring to FIG. 2, in an embodiment of the present disclosure, a first detailed procedure of configuring a resource for a DRB is as follows:

Step 200: A first CBS determines resource configuration information used by a first DBS to separately allocate a resource to at least one DRB of a UE.

Step 210: Add the resource configuration information to a first resource allocation indication, and send the first resource allocation indication to the first DBS, so that the first DBS separately allocates the resource to the at least one DRB of the UE according to the resource configuration information.

In this embodiment of the present disclosure, the resource configuration information determined by the first CBS carries multiple types of content. Optionally, the resource configuration information carries one or any combination of identifier information of the UE, DRB identifier information separately corresponding to the at least one DRB of the UE, and interface resource information corresponding to each piece of DRB identifier information. That is, the first CBS instructs the first DBS to separately allocate the resource to the at least one DRB of the UE according to the resource configuration information in multiple manners. Optionally, the first CBS instructs the first DBS to separately allocate, according to at least one of the identifier information of the UE, DRB identifier information separately corresponding to the at least one DRB of the UE, and interface resource information corresponding to each piece of DRB identifier information that are included in the resource configuration information, interface resource information corresponding to corresponding DRB identifier information, to a DRB corresponding to each piece of DRB identifier information of the UE corresponding to the identifier information of the UE, where the interface resource information includes X2+ interface resource information and/or air interface resource information. There are multiple types of X2+ interface resource information, for example, an endpoint identifier and a port IP (Internet Protocol, Internet Protocol).

In this embodiment of the present disclosure, the resource configuration information determined by the first CBS and used by the first DBS to separately allocate a resource to the at least one DRB of the UE is determined according to a QoS parameter of the at least one DRB of the UE, where the QoS parameter is carried in a received resource configuration control instruction sent by a core network. After determining the resource configuration information used by the first DBS to separately allocate a resource to the at least one DRB of the UE, the first CBS may immediately add the determined resource configuration information to the first resource allocation indication, and send the first resource allocation indication to the first DBS, or may, if a locally saved preset rule is satisfied, add the determined resource configuration information to the first resource allocation indication and send the first resource allocation indication to the first DBS. The preset rule may be a preset time point, and then, at the preset time point, the determined resource configuration information is added to the first resource allocation indication, and the first resource allocation indication is sent to the first DBS.

In an actual application, the first CBS not only needs to separately allocate an X2+ interface resource and/or an air interface resource to the at least one DRB of the UE according to the received resource configuration control instruction sent by the core network, but also needs to configure a resource for an S1+ interface between the first CBS and the core network according to the received resource configuration control instruction sent by the core network.

In this embodiment of the present disclosure, after step 210 is performed, the first CBS further needs to receive a first resource configuration response message fed back by the first DBS, where the first resource configuration response message is sent by the first DBS after the first DBS completes resource configuration according to the resource configuration information.

In this embodiment of the present disclosure, the first resource configuration response message that is fed back by the first DBS after the first DBS completes resource configuration and that is received by the first CBS may include multiple types of content. Optionally, the first CBS receives the first resource configuration response message that is fed back by the first DBS after the first DBS completes resource configuration and that includes at least one of DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

Further, in this embodiment of the present disclosure, after receiving the first resource configuration response message fed back by the first DBS, the first CBS further needs to send a first RRC reconfiguration instruction to the UE, which is used to instruct the UE to establish a DRB with the first CBS according to the first RRC reconfiguration instruction, and allocate a resource to an air interface, where the first RRC reconfiguration instruction may further carry system configuration information of the first DBS, for example, frequency information and pilot information that are used by the first DBS.

Then, after receiving the first RRC reconfiguration instruction sent by the first CBS, the UE establishes a DRB with the first CBS according to the first RRC reconfiguration instruction, and allocates a resource to an air interface. After successfully establishing the DRB and allocating the resource to the air interface, the UE feeds back a complete response message to the first CBS.

For better understanding of this embodiment of the present disclosure, the following provides a specific application scenario, and describes a resource configuration process for a DRB in further detail.

Embodiment 1

Figure 3:
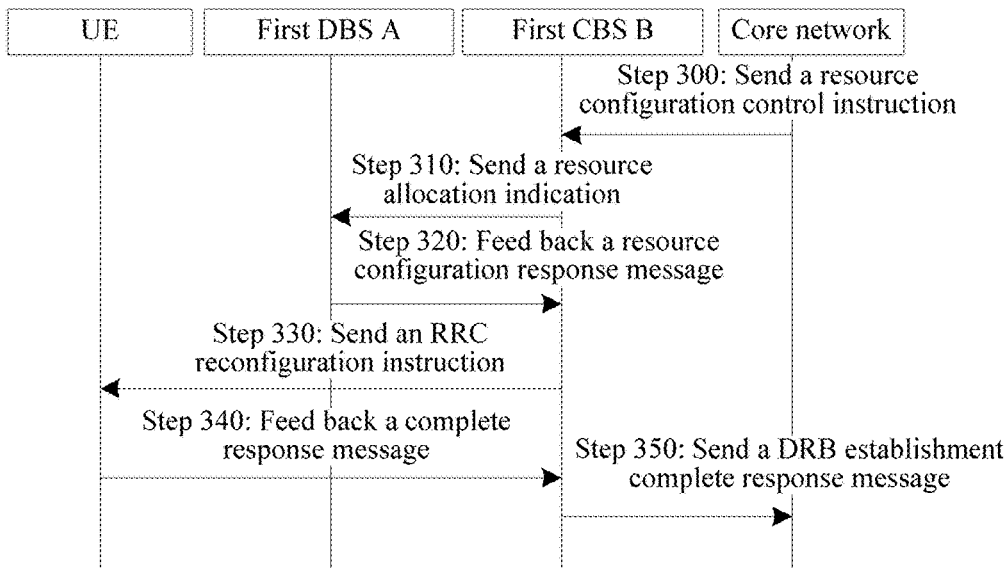
FIG. 3 is a first flowchart of configuring a resource for a DRB according to an embodiment of the present disclosure.

Specifically, refer to FIG. 3 (where a first DBS is A, and a first CBS is B).

Step 300: A core network sends a resource configuration control instruction to B, which is used to instruct B to separately allocate a resource to at least one DRB of a target UE.

In this step, the instructing B to separately allocate a resource to at least one DRB of a target UE includes instructing B to separately allocate a resource to an X2+ interface, an air interface, and an S1+ interface.

Step 310: B sends a resource allocation indication to A according to the received resource configuration control instruction sent by the core network, to instruct A to separately allocate a resource to the at least one DRB of the UE according to resource configuration information carried in the resource allocation indication.

In this step, the instructing A to separately allocate a resource to the at least one DRB of the UE according to resource configuration information carried in the resource allocation indication is specifically: instructing B to separately allocate, according to at least one of identifier information of the UE, DRB identifier information separately corresponding to the at least one DRB of the UE, and interface resource information corresponding to each piece of DRB identifier information that are included in the resource configuration information carried in the resource allocation indication, X2+ interface resource information and air interface resource information that are corresponding to corresponding DRB identifier information, to a DRB corresponding to each piece of DRB identifier information of the UE corresponding to the identifier information of the UE.

Step 320: After completing resource allocation, A feeds back a resource configuration response message to B.

In this step, B receives the resource configuration response message that is fed back by A after A completes resource configuration and that includes at least one of DRB identifier information corresponding to each DRB to which a resource is successfully allocated, interface resource information separately corresponding to at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

Step 330: After receiving the resource configuration response message fed back by A, B sends an RRC reconfiguration instruction to the UE, which is used to instruct the UE to establish a DRB with B according to the RRC reconfiguration instruction, and allocate a resource to an air interface.

The RRC reconfiguration instruction may further carry system configuration information of A, for example, frequency information and pilot information that are used by A.

Step 340: After receiving the RRC reconfiguration instruction sent by B, the UE establishes the DRB with B according to the RRC reconfiguration instruction, and allocates the resource to the air interface, and after successfully establishing the DRB and allocating the resource, feeds back a complete response message to B.

Step 350: After receiving the complete response message fed back by the UE, B sends a DRB establishment complete response message to the core network, which is used to indicate that the UE successfully establishes the DRB.

In this embodiment of the present disclosure, in some cases, a resource successfully allocated to the at least one DRB of the UE needs to be released, and the successfully allocated resource is released in multiple manners. Optionally, the first CBS sends a first resource release indication to the first DBS, so that the first DBS releases, for the UE according to at least one type of information of identifier information of the UE and at least one piece of DRB identifier information corresponding to a DRB having a resource to be released, the resource on the DRB corresponding to the at least one piece of DRB identifier information, where the first resource release indication carries the identifier information of the UE and the at least one piece of DRB identifier information corresponding to the DRB having the resource to be released. The releasing the resource on the DRB corresponding to the at least one piece of DRB identifier information may be releasing an X2+ interface resource (for example, an endpoint identifier and a port IP) allocated to a DRB corresponding to each piece of DRB identifier information, and/or releasing an air interface resource allocated to a DRB corresponding to each piece of DRB identifier information (that is, releasing a protocol entity resource corresponding to the DRB corresponding to the DRB identifier information).

Then, after the first CBS instructs the first DBS to release, for the UE, the resource on the DRB corresponding to the at least one piece of DRB identifier information, the first CBS sends a first RRC reconfiguration instruction to the UE, so that the UE releases an air interface resource of the DRB corresponding to the at least one piece of DRB identifier information.

In this embodiment of the present disclosure, a condition for triggering the first CBS to send the first resource release indication to the first DBS may be a locally saved preset rule, or may be a received resource release control instruction sent by the core network. If the first CBS uses the locally saved preset rule as the trigger condition, the first CBS sends the first resource release indication to the first DBS if the preset rule is satisfied; if the first CBS uses the received resource release control instruction sent by the core network as the trigger condition, the first CBS immediately sends the first resource release indication to the first DBS when receiving the resource release control instruction sent by the core network.

In an actual application, the first CBS not only needs to release an X2+ interface resource and/or an air interface resource according to the received resource release control instruction sent by the core network, but also needs to release a resource of an S1+ interface between the first CBS and the core network according to the received resource release control instruction sent by the core network.

For better understanding of this embodiment of the present disclosure, the following provides a specific application scenario, and describes a resource release process for a DRB in further detail.

Embodiment 2

Figure 4:
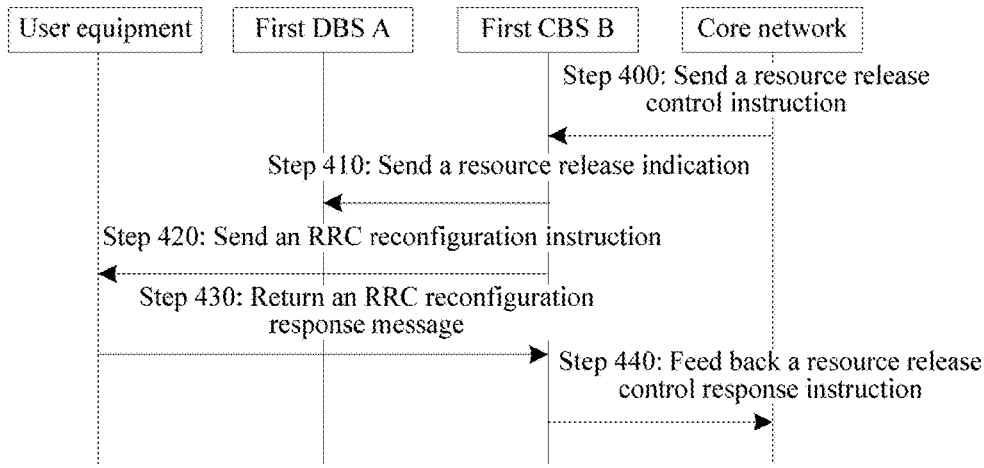
FIG. 4 is a flowchart of releasing a resource of a DRB according to the present disclosure.

Specifically, refer to FIG. 4 (where a first DBS is A, and a first CBS is B).

Step 400: A core network sends a resource release control instruction to B, which is used to instruct B to release a resource on at least one DRB of a target UE.

In this step, the instructing B to release a resource on at least one DRB of a target UE includes instructing B to release an X2+ interface resource, an air interface resource, and an S1+ interface resource.

Step 410: B sends a resource release indication to A according to the received resource release control instruction sent by the core network.

In this embodiment, the resource release indication sent by B to A is used to instruct A to release, according to at least one type of information of identifier information of the UE and at least one piece of DRB identifier information corresponding to a DRB having a resource to be released, the resource on the DRB corresponding to the at least one piece of DRB identifier information of the UE, that is, release an X2+ interface resource between B and A and an air interface resource between B and the UE, where the resource release indication carries at least one of the identifier information of the UE and the at least one piece of DRB identifier information corresponding to the DRB having the resource to be released.

Step 420: After receiving a resource release response indication returned by A, B sends an RRC reconfiguration instruction to the UE, to instruct the UE to release at least one DRB between the UE and B, and an air interface resource of the at least one DRB.

Step 430: B receives an RRC reconfiguration response message that is returned by the UE after the UE completes release.

Step 440: B feeds back a resource release control response instruction to the core network, which is used to indicate that the UE successfully releases the resource on the DRB.

In this embodiment of the present disclosure, the UE may switch from the first DBS to a second DBS. When the UE prepares to switch from the first DBS to the second DBS, the first CBS sends a second resource allocation indication to the second DBS, to enable the second DBS to separately allocate a resource to the at least one DRB of the UE. The enabling the second DBS to separately allocate a resource to the at least one DRB of the UE may be enabling the second DBS to separately allocate an X2+ interface resource and an air interface resource to the at least one DRB of the UE.

Then, after receiving a second resource configuration response message that is returned by the second DBS after the second DBS allocates a resource to each DRB of the UE, the first CBS sends a second RRC reconfiguration instruction to the UE, so that the UE switches from the first DBS to the second DBS. In the foregoing process, the switching, by the UE, to the second DBS includes completing time-frequency synchronization with the second DBS. After the UE switches to the second DBS, the UE can receive user data from and send user data to the second DBS.

In this embodiment of the present disclosure, the second RRC reconfiguration instruction may include multiple types of content, for example, include frequency information and pilot information that are used by the second DBS.

Further, after the UE switches from the first DBS to the second DBS, that is, after the first CBS receives an RRC reconfiguration complete response message that is returned by the UE after the UE completes switching according to the second RRC reconfiguration instruction, the first CBS sends a second resource release indication to the first DBS, to instruct the first DBS to release the resource separately allocated to the at least one DRB of the UE. The enabling the first DBS to release the resource separately allocated to the at least one DRB of the UE may be enabling the first DBS to release the X2+ interface resource and/or the air interface resource that are/is separately allocated to the at least one DRB of the UE.

For better understanding of this embodiment of the present disclosure, the following provides a specific application scenario, and describes in further detail a process of switching, by a UE, from a first DBS to a second DBS after resource configuration is completed for a DRB.

Embodiment 3

Figure 5:
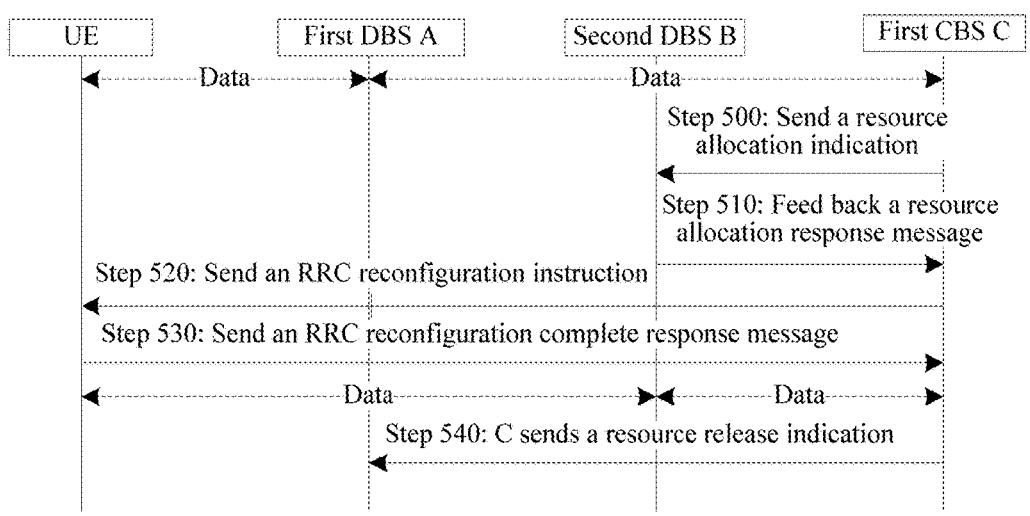
FIG. 5 is a second flowchart of configuring a resource for a DRB according to the present disclosure.

Specifically, refer to FIG. 5 (where a first DBS is A, a second DBS is B, and a first CBS is C).

Step 500: When a UE prepares to switch from A to B, C sends a resource allocation indication to B, to instruct B to separately allocate a resource to at least one DRB of the UE.

In this step, there are multiple conditions for triggering C to send the resource allocation indication to B. For example, C receives a pilot signal, obtained by the UE by measuring, of a DBS of each neighboring cell, and in this case, if C determines that a pilot signal of B is relatively strong, C sends the resource allocation indication to B. C may instruct the UE to periodically report the pilot signal, obtained by measuring, of the DBS of each neighboring cell, or may send an indication to the UE according to service quality, fed back by the UE, of a current cell in which the UE is located, so that the UE measures a pilot signal of a DBS of a neighboring cell.

In this step, there are multiple manners in which C sends the resource allocation indication to B, to instruct B to separately allocate the resource to the at least one DRB of the UE. Optionally, B is made to separately allocate, according to at least one type of information of identifier information of the UE, DRB identifier information separately corresponding to the at least one DRB of the UE, and interface resource information corresponding to each piece of DRB identifier information that are included in the received resource allocation indication, interface resource information corresponding to corresponding DRB identifier information, to a DRB corresponding to each piece of DRB identifier information of the UE corresponding to the identifier information of the UE, where the interface resource information includes X2+ interface resource information and/or air interface resource information.

Step 510: After receiving the resource allocation indication sent by C, B allocates a corresponding resource according to the indication, and feeds back a resource configuration response message to C after completing resource allocation.

In this step, the allocating, by B, a corresponding resource according to the indication may be separately allocating an X2+ interface resource and/or an air interface resource to the at least one DRB of the UE according to the indication.

Step 520: After receiving the resource configuration response message fed back by B, C sends an RRC reconfiguration instruction to the UE, to enable the UE to switch from A to B.

In this step, the RRC reconfiguration instruction may further carry system configuration information of B, for example, frequency information and pilot information that are used by B.

Step 530: After receiving the RRC reconfiguration instruction sent by C, the UE switches from A to B according to the instruction, and sends an RRC reconfiguration complete response message to C.

In this embodiment, accessing B by the UE includes completing time-frequency synchronization with B. After this step is completed, the UE can receive user data from B and send user data to B.

Step 540: After receiving the RRC reconfiguration complete response message fed back by the UE, C sends a resource release indication to A, to instruct A to release a resource separately allocated to the at least one DRB of the UE.

The enabling A release a resource to separately allocated to the at least one DRB of the UE may be enabling A to release the X2+ interface resource and/or the air interface resource that are/is separately allocated to the at least one DRB of the UE.

In this embodiment of the present disclosure, the UE may switch from the first CBS to a second CBS. When the UE prepares to switch from the first CBS to the second CBS, that is, after the UE receives a DBS switching instruction sent by the first CBS, the first CBS sends a switching indication to the second CBS, so that the second CBS separately allocates a resource to the at least one DRB of the UE. After separately allocating a resource to the at least one DRB of the UE according to the received switching indication sent by the first CBS, the second CBS returns a third resource configuration response message to the first CBS. The separately allocating, by the second CBS, a resource to the at least one DRB of the UE may be separately allocating an X2+ interface resource and/or an air interface resource to the at least one DRB of the UE.

Then, the first CBS sends a third RRC reconfiguration instruction to the UE, to enable the UE to switch from the first CBS to the second CBS. The enabling the UE to switch from the first CBS to the second CBS is specifically: enabling the UE to release an RRC connection to the first CBS, and establishing an RRC connection to the second CBS.

Further, after the first CBS receives a switching complete message that is returned by the UE after the UE switches from the first CBS to the second CBS, the first CBS receives a third resource release indication sent by the second CBS, and then, the first CBS is made to release the resource separately allocated to the at least one DRB of the UE. The resource released by the first CBS and separately allocated to the at least one DRB of the UE may be the X2+ interface resource and/or the air interface resource separately allocated to the at least one DRB of the UE.

For better understanding of this embodiment of the present disclosure, the following provides a specific application scenario, and describes in further detail a process of switching, by a UE, from a first CBS to a second CBS after resource configuration is completed for a DRB.

Embodiment 4

Figure 6:
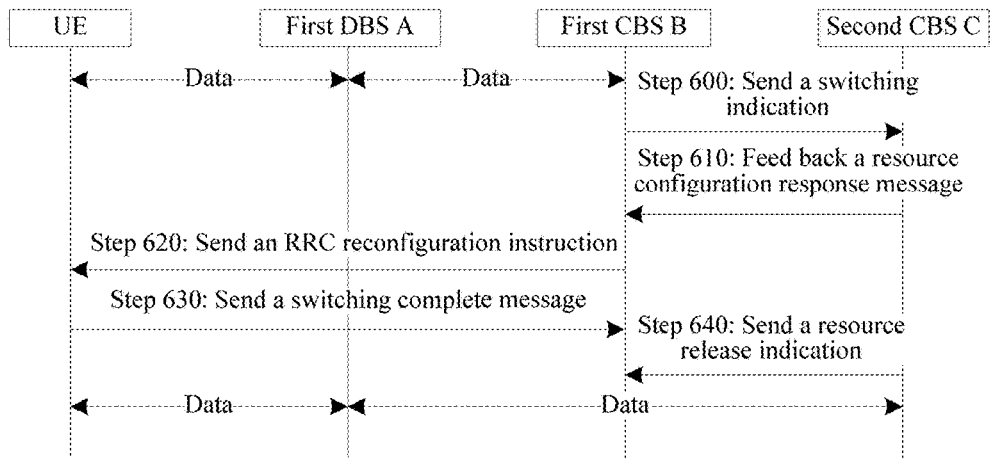
FIG. 6 is a third flowchart of configuring a resource for a DRB according to the present disclosure.

Specifically, refer to FIG. 6 (where a first DBS is A, a first CBS is B, and a second CBS is C).

Step 600: When a UE prepares to switch from B to C, B sends a switching indication to C, so that C separately allocates a resource to at least one DRB of the UE.

In this step, there may be multiple conditions for triggering B to send the switching indication to C. For example, B receives a pilot signal, obtained by the UE by measuring, of a CBS of each neighboring cell, and in this case, B determines that a pilot signal of C is relatively strong, and then, B sends the switching indication to C. B may instruct the UE to periodically report the pilot signal, obtained by measuring, of the CBS of each neighboring cell, or may send an indication to the UE according to service quality, fed back by the UE, of a current cell in which the UE is located, so that the UE measures a pilot signal of a CBS of a neighboring cell.

In this step, there are multiple manners in which B sends the switching indication to C, to instruct C to separately allocate the resource to the at least one DRB of the UE. Optionally, C is made to separately allocate, according to at least one type of information of identifier information of the UE, DRB identifier information separately corresponding to the at least one DRB of the UE, and interface resource information corresponding to each piece of DRB identifier information that are included in the received switching indication, interface resource information corresponding to corresponding DRB identifier information, to a DRB corresponding to each piece of DRB identifier information of the UE corresponding to the identifier information of the UE, where the interface resource information includes one or any combination of X2+ interface resource information, air interface resource information, and S1+ interface resource information.

Step 610: After receiving the switching indication sent by B, C allocates a corresponding resource according to the indication, and feeds back a resource configuration response message to B after completing resource allocation.

In this step, the allocating, by C, a corresponding resource according to the indication may be separately configuring, for the at least one DRB of the UE according to the indication, at least one of the following resources: an X2+ interface resource, an air interface resource, and an S1+ interface resource.

Step 620: After receiving the resource configuration response message fed back by C, B sends an RRC reconfiguration instruction to the UE, to enable the UE to switch from B to C.

In this step, the enabling the UE to switch from B to C may be enabling the UE to release an RRC connection to B, and establish an RRC connection to C.

Step 630: After receiving the RRC reconfiguration instruction sent by B, the UE switches from B to C according to the instruction, and sends a switching complete message to B.

Connecting to C by the UE includes completing time-frequency synchronization with C. After this step is completed, the UE can receive user data from C and send user data to C.

Step 640: After receiving the switching complete message fed back by the UE, B receives a resource release indication sent by C, so that B releases the resource separately allocated to the at least one DRB of the UE.

The enabling B to release the resource separately allocated to the at least one DRB of the UE may be enabling B to release at least one of the following resources separately allocated to the at least one DRB of the UE: the X2+ interface resource, the air interface resource, and the S1+ interface resource.

For better understanding of this embodiment of the present disclosure, the following provides a specific application scenario, and describes in further detail a process of switching, by a UE, from a first CBS to a second CBS and switching from a first DBS to a second DBS after resource configuration is completed for a DRB.

Embodiment 5

Figure 7:
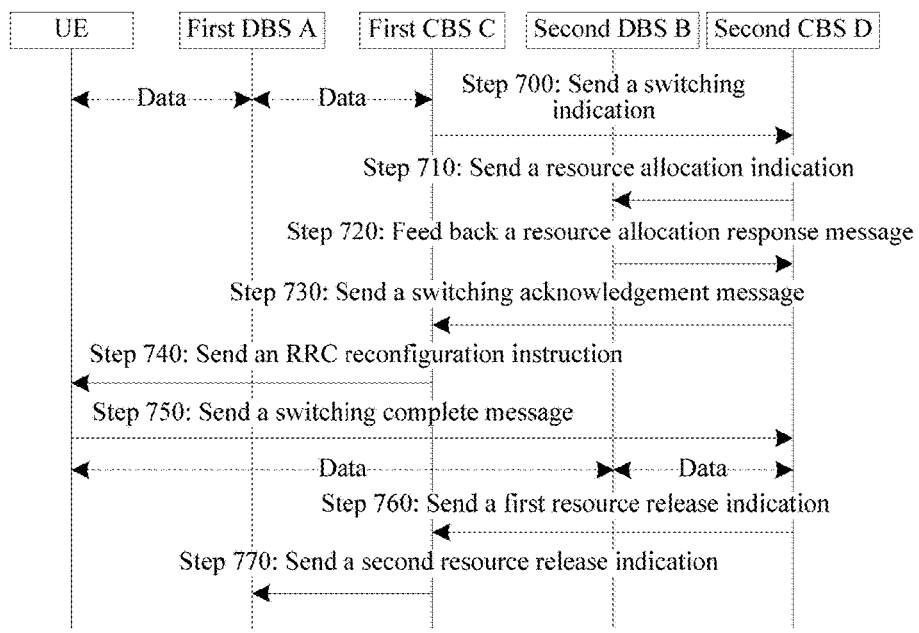
FIG. 7 is a fourth flowchart of configuring a resource for a DRB according to the present disclosure.

Specifically, refer to FIG. 7 (where a first DBS is A, a second DBS is B, a first CBS is C, and a second CBS is D).

Step 700: C sends a switching indication to D, to instruct D to separately allocate a resource to at least one DRB of a UE.

In this step, the enabling D to separately allocate a resource to at least one DRB of UE is specifically enabling D to separately allocate, to the at least one DRB of the UE, one or any combination of an air interface resource, an X2+ interface resource, and an S1+ interface resource.

Step 710: After receiving the switching indication sent by C, D separately allocates a resource to the at least one DRB of the target UE, and sends a resource allocation indication to B, so that B separately allocates a resource to the at least one DRB of the UE.

Step 720: After receiving the resource allocation indication sent by D, B allocates a corresponding resource according to the indication, and feeds back a resource allocation response message to D after completing resource allocation.

Step 730: After receiving the resource allocation response message fed back by B, D sends a switching confirmation message to C.

Step 740: After receiving the switching confirmation message sent by D, C sends an RRC reconfiguration instruction to the UE, which is used to request the UE to switch from C to D.

Step 750: After receiving the RRC reconfiguration instruction sent by C, the UE switches from C to D, and sends a switching complete message to D.

In this step, the switching, by the UE, from C to D is specifically establishing, by the UE, an RRC connection to D, and releasing an RRC connection from C; connecting to D by the UE includes completing time-frequency synchronization with D. After this step is completed, the UE can receive user data from D and send user data to D.

Step 760: D sends a first resource release indication to C, so that C releases the resource separately allocated to the at least one DRB of the UE.

Step 770: After receiving the first resource release indication sent by D, C releases the resource separately allocated to the at least one DRB of the UE, and sends a second resource release indication to A, which is used to instruct A to release the resource separately allocated to the at least one DRB of the UE.

Figure 8:
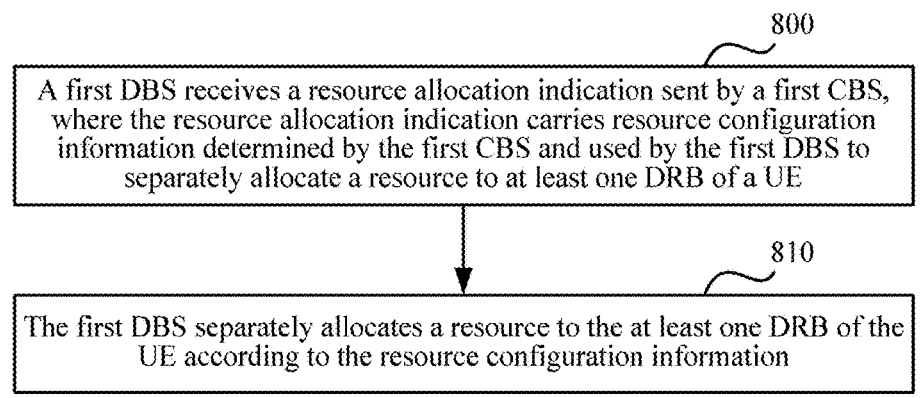
FIG. 8 is a second detailed schematic flowchart of configuring a resource for a DRB according to an embodiment of the present disclosure.

Referring to FIG. 8, in an embodiment of the present disclosure, a second detailed procedure of configuring a resource for a DRB is as follows:

Step 800: A first DBS receives a resource allocation indication sent by a first CBS, where the resource allocation indication carries resource configuration information determined by the first CBS and used by the first DBS to separately allocate a resource to at least one DRB of a UE.

Step 810: The first DBS separately allocates a resource to the at least one DRB of the UE according to the resource configuration information.

In this embodiment of the present disclosure, there are multiple manners in which the first DBS separately allocates the resource to the at least one DRB of the UE according to the resource configuration information. Optionally, the first DBS separately allocates, according to at least one of identifier information of the UE, DRB identifier information separately corresponding to the at least one DRB of the UE, and interface resource information corresponding to each piece of DRB identifier information that are included in the resource configuration information, interface resource information corresponding to corresponding DRB identifier information, to a DRB corresponding to each piece of DRB identifier information of the UE corresponding to the identifier information of the UE.

In this embodiment of the present disclosure, the first DBS sends, to the first CBS, a resource configuration response message that further needs to be fed back to the first CBS after the first DBS completes resource configuration according to the resource configuration information.

In this embodiment of the present disclosure, there are multiple manners in which the first DBS sends, to the first CBS, the resource configuration response message that is fed back to the first CBS after the first DBS completes resource configuration according to the resource configuration information. Optionally, the first DBS sends, to the first CBS, the resource configuration response message that is fed back after resource configuration is completed and that includes at least one type of information of DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

In this embodiment of the present disclosure, optionally, the interface resource information includes X2+ interface resource information and/or air interface resource information.

Further, in this embodiment of the present disclosure, after separately allocating the resource to the at least one DRB of the UE according to the resource configuration information, the first DBS further needs to receive a first resource release indication sent by the first CBS, and releases, for the UE according to at least one type of information of the identifier information of the UE and at least one piece of DRB identifier information corresponding to a DRB having a resource to be released, the resource on the DRB corresponding to the at least one piece of DRB identifier information, where the first resource release indication carries the identifier information of the UE and the at least one piece of DRB identifier information corresponding to the DRB having the resource to be released.

In this embodiment of the present disclosure, after the first DBS separately allocates the resource to the at least one DRB of the UE according to the resource configuration information, the UE may switch from the first DBS to a second DBS. If the UE prepares to switch from the first DBS to the second DBS, the first DBS receives a second resource release indication, and releases, according to the second resource release indication, the resource separately allocated to the at least one DRB of the UE, where the second resource release indication is sent by the first CBS after the first CBS receives an RRC reconfiguration complete response message that is returned by the UE after the UE completes switching according to an RRC reconfiguration instruction.

Figure 9:
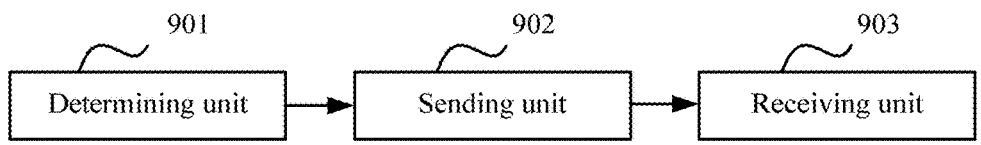
FIG. 9 is a first schematic diagram of a functional structure of a CBS according to an embodiment of the present disclosure.

Referring to FIG. 9, an embodiment of the present disclosure provides a CBS, where the CBS mainly includes:

a determining unit 901, configured to determine resource configuration information used by a first DBS to separately allocate a resource to at least one DRB of UE; and a sending unit 902, configured to add the resource configuration information determined by the determining unit 901 to a first resource allocation indication, and send the first resource allocation indication to the first DBS, so that the first DBS separately allocates the resource to the at least one DRB of the UE according to the resource configuration information.

Optionally, in this embodiment of the present disclosure, the resource configuration information determined by the determining unit 901 includes at least one of the following: identifier information of the UE, DRB identifier information separately corresponding to the at least one DRB of the UE, and interface resource information corresponding to each piece of DRB identifier information.

In this embodiment of the present disclosure, the CBS further includes: a receiving unit 903, configured to receive a first resource configuration response message that is fed back by the first DBS after the first DBS completes resource configuration according to the resource configuration information.

Optionally, in this embodiment of the present disclosure, the first resource configuration response message received by the receiving unit 903 includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

Optionally, in this embodiment of the present disclosure, the interface resource information included in the resource configuration information determined by the determining unit 901 includes X2+ interface resource information and/or air interface resource information.

Further, in this embodiment of the present disclosure, the sending unit 902 is further configured to send a first resource release indication to the first DBS, so that the first DBS releases, for the UE according to at least one type of information of identifier information of the UE and at least one piece of DRB identifier information corresponding to a DRB having a resource to be released, the resource on the DRB corresponding to the at least one piece of DRB identifier information, where the first resource release indication carries at least one of the identifier information of the UE and the at least one piece of DRB identifier information corresponding to the DRB having the resource to be released.

Further, in this embodiment of the present disclosure, the sending unit 902 sends a first RRC reconfiguration instruction to the UE, so that the UE releases an air interface resource of the DRB corresponding to the at least one piece of DRB identifier information.

Further, in this embodiment of the present disclosure, the sending unit 902 sends a second resource allocation indication to a second DBS, so that the second DBS separately allocates a resource to the at least one DRB of the UE; and after receiving a second resource configuration response message that is returned by the second DBS after the second DBS allocates the resource to the at least one DRB of the UE, the sending unit 902 sends a second RRC reconfiguration instruction to the UE, so that the UE switches from the first DBS to the second DBS.

Optionally, in this embodiment of the present disclosure, the second RRC reconfiguration instruction sent by the sending unit 902 includes frequency information and/or pilot information that are/is used by the second DBS.

Further, in this embodiment of the present disclosure, after an RRC reconfiguration complete response message that is returned by the UE after the UE completes switching according to the second RRC reconfiguration instruction is received, the sending unit 902 sends a second resource release indication to the first DBS, so that the first DBS releases the resource separately allocated to the at least one DRB of the UE.

Further, in this embodiment of the present disclosure, the sending unit 902 sends a switching indication to another CBS, so that the another CBS separately allocates a resource to the at least one DRB of the UE; and after a third resource configuration response message that is returned by the another CBS after the another CBS allocates the resource to the at least one DRB of the UE is received, the sending unit 902 sends a third RRC reconfiguration instruction to the UE, so that the UE switches from the current CBS to the another CBS.

Further, in this embodiment of the present disclosure, after the UE switches from the current CBS to the another CBS, and the receiving unit 903 receives a third resource release indication sent by the another CBS, the determining unit 901 instructs the current CBS to release the resource separately allocated to the at least one DRB of the UE.

Figure 10:
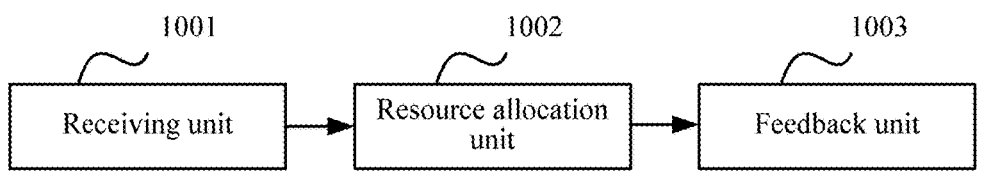
FIG. 10 is a first schematic diagram of a functional structure of a DBS according to an embodiment of the present disclosure.

Referring to FIG. 10, an embodiment of the present disclosure provides a DBS, where the DBS mainly includes:

a receiving unit 1001, configured to receive a resource allocation indication sent by a first control base station CBS, where the resource allocation indication carries resource configuration information determined by the first CBS and used by the DBS to separately allocate a resource to at least one data radio bearer DRB of user equipment UE; and a resource allocation unit 1002, configured to separately allocate the resource to the at least one DRB of the UE according to the resource configuration information.

Optionally, in this embodiment of the present disclosure, the resource configuration information received by the receiving unit 1001 includes at least one of the following: identifier information of the UE, DRB identifier information separately corresponding to the at least one DRB of the UE, and interface resource information corresponding to each piece of DRB identifier information.

Further, the DBS further includes: a feedback unit 1003, configured to send, to the first CBS, a resource configuration response message that is fed back after resource configuration is completed according to the resource configuration information.

Optionally, in this embodiment of the present disclosure, the resource configuration response message fed back by the feedback unit 1003 includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

Optionally, in this embodiment of the present disclosure, the interface resource information in the resource configuration information received by the receiving unit 1001 includes X2+ interface resource information and/or air interface resource information.

Further, in this embodiment of the present disclosure, the resource allocation unit 1002 is further configured to: after a first resource release indication sent by the first CBS is received, release, for the UE according to identifier information of the UE and/or at least one piece of DRB identifier information corresponding to a DRB having a resource to be released, the resource on the DRB corresponding to the at least one piece of DRB identifier information, where the first resource release indication carries the identifier information of the UE and/or the at least one piece of DRB identifier information corresponding to the DRB having the resource to be released.

Optionally, in this embodiment of the present disclosure, the resource allocation unit 1002 is further configured to: after a second resource release indication that is sent by the first CBS after the UE completes switching and returns an RRC reconfiguration complete response message is received, release, according to the second resource release indication, the resource separately allocated to the at least one DRB of the UE.

Figure 11:
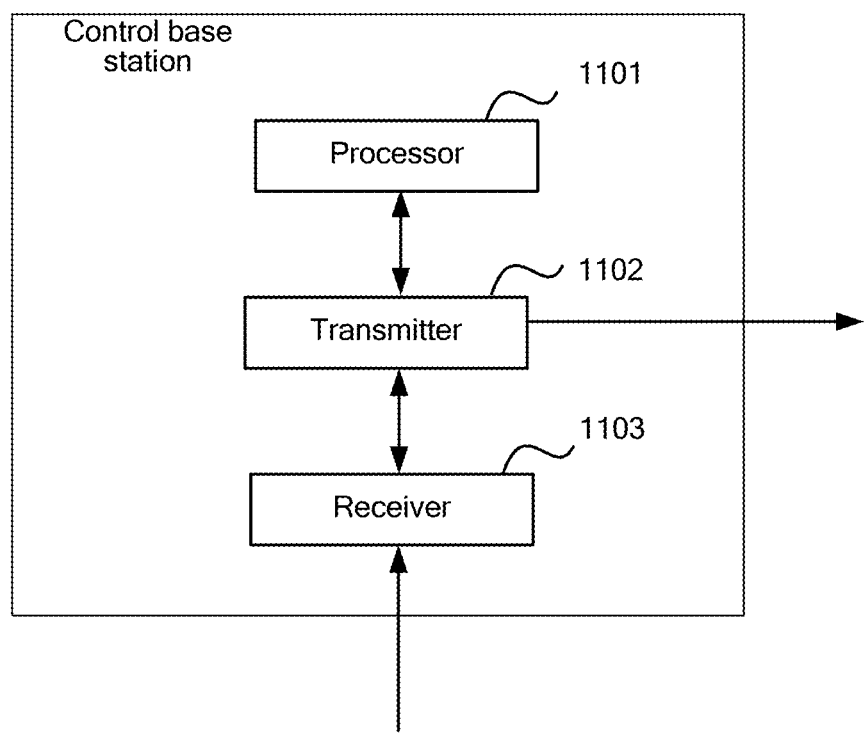
FIG. 11 is a second schematic diagram of a functional structure of a CBS according to an embodiment of the present disclosure.

Referring to FIG. 11, an embodiment of the present disclosure provides a CBS, where the CBS mainly includes:

a processor 1101, configured to determine resource configuration information used by a first data base station DBS to separately allocate a resource to at least one data radio bearer DRB of user equipment UE; and a transmitter 1102, configured to add the resource configuration information to a first resource allocation indication, and send the first resource allocation indication to the first DBS, so that the first DBS separately allocates the resource to the at least one DRB of the UE according to the resource configuration information.

Optionally, in this embodiment of the present disclosure, the resource configuration information determined by the processor 1101 includes at least one of the following: identifier information of the UE, DRB identifier information separately corresponding to the at least one DRB of the UE, and interface resource information corresponding to each piece of DRB identifier information.

The CBS further includes a receiver 1103, configured to receive a first resource configuration response message that is fed back by the first DBS after the first DBS completes resource configuration according to the resource configuration information.

Optionally, in this embodiment of the present disclosure, the first resource configuration response message received by the receiver 1103 includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

Optionally, in this embodiment of the present disclosure, the interface resource information included in the resource configuration information determined by the processor 1101 includes X2+ interface resource information and/or air interface resource information.

Further, in this embodiment of the present disclosure, the transmitter 1102 is further configured to send a first resource release indication to the first DBS, so that the first DBS releases, for the UE according to identifier information of the UE and/or at least one piece of DRB identifier information corresponding to a DRB having a resource to be released, the resource on the DRB corresponding to the at least one piece of DRB identifier information, where the first resource release indication carries the identifier information of the UE and/or the at least one piece of DRB identifier information corresponding to the DRB having the resource to be released.

Further, in this embodiment of the present disclosure, the transmitter 1102 is further configured to send a first radio resource control RRC reconfiguration instruction to the UE, so that the UE releases an air interface resource of the DRB corresponding to the at least one piece of DRB identifier information.

Further, in this embodiment of the present disclosure, the transmitter 1102 is further configured to send a second resource allocation indication to a second DBS, so that the second DBS separately allocates a resource to the at least one DRB of the UE; and after a second resource configuration response message that is returned by the second DBS after the second DBS allocates the resource to the at least one DRB of the UE is received, send a second RRC reconfiguration instruction to the UE, so that the UE switches from the first DBS to the second DBS.

Optionally, in this embodiment of the present disclosure, the second RRC reconfiguration instruction sent by the transmitter 1102 includes frequency information and/or pilot information that are/is used by the second DBS.

Further, in this embodiment of the present disclosure, the transmitter 1102 is further configured to: after an RRC reconfiguration complete response message that is returned by the UE after the UE completes switching according to the second RRC reconfiguration instruction is received, send a second resource release indication to the first DBS, so that the first DBS releases the resource separately allocated to the at least one DRB of the UE.

Further, in this embodiment of the present disclosure, the transmitter 1102 is further configured to: send a switching indication to another CBS, so that the another CBS separately allocates a resource to the at least one DRB of the UE; and after a third resource configuration response message that is returned by the another CBS after the another CBS allocates the resource to the at least one DRB of the UE is received, send a third RRC reconfiguration instruction to the UE, so that the UE switches from the current CBS to the another CBS.

Further, in this embodiment of the present disclosure, the processor 1101 is further configured to: after the UE switches from the current CBS to the another CBS, and a third resource release indication sent by the another CBS is received, instruct the current CBS to release the resource separately allocated to the at least one DRB of the UE.

Figure 12:
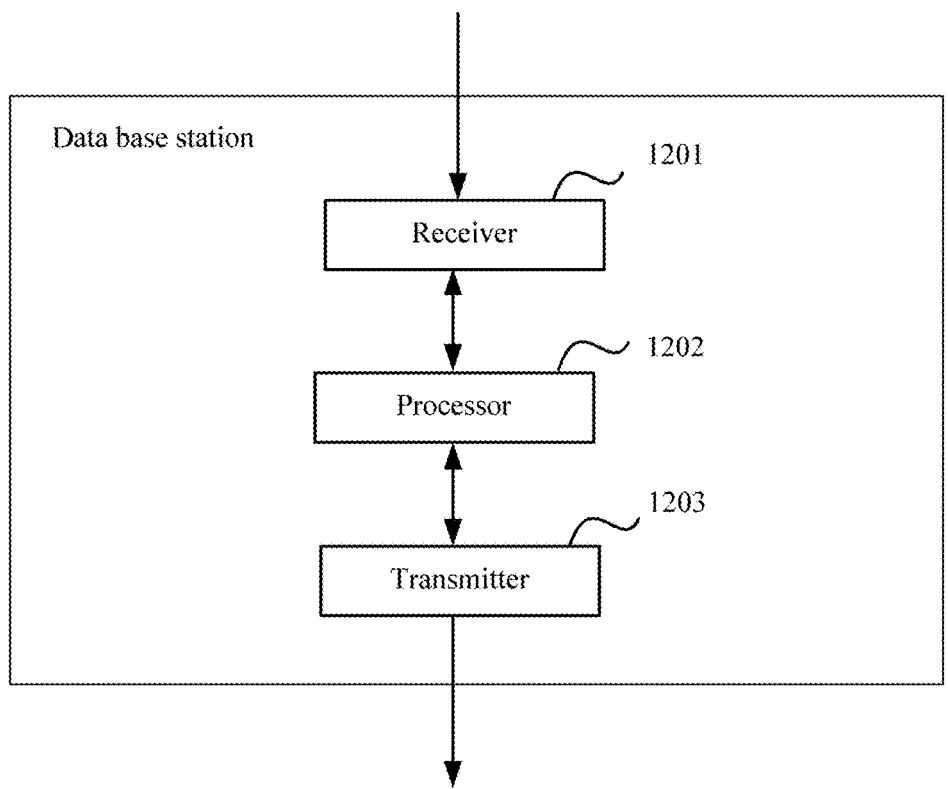
FIG. 12 is a second schematic diagram of a functional structure of a DBS according to an embodiment of the present disclosure.

Referring to FIG. 12, an embodiment of the present disclosure provides a DBS, where the DBS mainly includes:

a receiver 1201, configured to receive a resource allocation indication sent by a first control base station CBS, where the resource allocation indication carries resource configuration information determined by the first CBS and used by the DBS to separately allocate a resource to at least one data radio bearer DRB of user equipment UE; and a processor 1202, configured to separately allocate the resource to the at least one DRB of the UE according to the resource configuration information.

Optionally, in this embodiment of the present disclosure, the resource configuration information received by the receiver 1201 includes at least one of the following: identifier information of the UE, DRB identifier information separately corresponding to the at least one DRB of the UE, and interface resource information corresponding to each piece of DRB identifier information.

The DBS further includes: a transmitter 1203, configured to send, to the first CBS, a resource configuration response message that is fed back after resource configuration is completed according to the resource configuration information.

Optionally, in this embodiment of the present disclosure, the resource configuration response message fed back by the transmitter 1203 includes at least one of the following: DRB identifier information separately corresponding to at least one DRB to which a resource is successfully allocated, interface resource information separately corresponding to the at least one DRB to which a resource is successfully allocated, DRB identifier information separately corresponding to at least one DRB to which a resource is not successfully allocated, and cause information about unsuccessful resource allocation, corresponding to the at least one DRB to which a resource is not successfully allocated.

Optionally, in this embodiment of the present disclosure, the interface resource information in the resource configuration information received by the receiver 1201 includes X2+ interface resource information and/or air interface resource information.

Further, in this embodiment of the present disclosure, the processor 1202 is further configured to: after a first resource release indication sent by the first CBS is received, release, for the UE according to identifier information of the UE and/or at least one piece of DRB identifier information corresponding to a DRB having a resource to be released, the resource on the DRB corresponding to the at least one piece of DRB identifier information, where a first resource release indication carries the identifier information of the UE and/or the at least one piece of DRB identifier information corresponding to the DRB having the resource to be released.

Further, in this embodiment of the present disclosure, the processor 1202 is further configured to: after a second resource release indication that is sent by the first CBS after the UE completes switching and returns an RRC reconfiguration complete response message is received, release, according to the second resource release indication, the resource separately allocated to the at least one DRB of the UE.

In conclusion, in the embodiments of the present disclosure, a method for configuring a resource for a DRB is provided, where a first CBS first determines resource configuration information used by a first DBS to separately allocate a resource to at least one DRB of a UE, and then sends a first resource allocation indication to the first DBS, where the first resource allocation indication carries the determined resource configuration information; and then, the first DBS is made to separately allocate the resource to each DRB of the UE according to the resource configuration information. In this way, even if the first DBS does not have a function of a control plane, the first DBS can still configure a resource for each protocol entity in the first DBS according to the resource configuration information carried in the received first resource allocation indication sent by the first CBS, thereby ensuring effective running of a data/signaling separation network, and effectively implementing resource configuration for a protocol entity in a DBS according to a QoS requirement of a DRB.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the foregoing embodiments of the present disclosure have been described, persons skilled in the art can make changes and modifications to these embodiments once they learn the basic inventive concept. Therefore, the following claims are intended to be construed as to cover the foregoing embodiments and all changes and modifications falling within the scope of the present disclosure.

Obviously, persons skilled in the art can make various modifications and variations to the embodiments of the present disclosure without departing from the scope of the embodiments of the present disclosure. In this way, the present disclosure is intended to cover these modifications and variations provided that these modifications and variations to the embodiments of the present disclosure fall within the scope of the claims of the present disclosure and their equivalent technologies.

What is claimed is:

1. A method for data radio bearer (DRB) resource configuration, comprising:
    determining, by a first control base station (CBS), resource configuration information for a first data base station (DBS), according to a quality of service (QoS) parameter of a data radio bearer (DRB) of a user equipment (UE) carried in a received resource configuration control instruction sent by a core network, wherein the resource configuration information is used to enable the first DBS to allocate a resource to a DRB of the UE;
    providing a first resource allocation indication message including the resource configuration information; and
    sending the first resource allocation indication message to the first DBS;
    wherein the resource configuration information comprises DRB identifier information or interface resource information, the DRB identifier information corresponding to the DRB of the UE, and the interface resource information corresponding to the DRB identifier information.

2. The method according to claim 1, wherein the resource configuration information further comprises: identifier information of the UE.

3. The method according to claim 1, further comprising:
    receiving, by the first CBS, a first resource configuration response message from the first DBS, wherein the first resource configuration response message is sent after the first DBS completes resource configuration according to the resource configuration information.

4. The method according to claim 1, wherein the interface resource information comprises at least one of X2+ interface resource information and air interface resource information.

5. The method according to claim 1, wherein the method further comprises:
    sending, by the first CBS, a first resource release indication message to the first DBS, to enable the first DBS to release the resource on the DRB for the UE based on UE identifier information and/or DRB identifier information carried in the first resource release indication message, wherein the DRB identifier information is used to identify the DRB having the resource to be released.

6. The method according to claim 1, wherein the method further comprises:
    sending, by the first CBS, a second resource allocation indication message to a second DBS to enable the second DBS to allocate a separate resource to the DRB of the UE based on the second resource allocation indication message;
    receiving, at the first CBS, a second resource configuration response message from the second DBS; and
    sending, by the first CBS, a second radio resource control (RRC) reconfiguration instruction to the UE to enable the UE to switch from the first DBS to the second DBS.

7. The method according to claim 6, wherein the second RRC reconfiguration instruction comprises at least one of frequency information and pilot information for the second DBS.

8. The method according to claim 1, wherein the method further comprises:
    sending, by the first CBS, a switching indication message to a second CBS to enable the second CBS to allocate a resource to the DRB of the UE;
    receiving, at the first CBS, a third resource configuration response message from the second CBS; and
    sending, by the first CBS, a third RRC reconfiguration instruction to the UE to allow the UE to switch from the first CBS to the second CBS.

9. A method for data radio bearer (DRB) resource configuration, comprising:
    receiving, by a first data base station (DBS), a resource allocation indication message from a first control base station (CBS), wherein the resource allocation indication message is determined by the CSB according to a quality of service (QoS) parameter of a data radio bearer (DRB) of a user equipment (UE) carried in a received resource configuration control instruction sent by a core network, and the resource allocation indication message carries resource configuration information for a DRB of the UE; and
    allocating, by the first DBS, a resource to the DRB of the UE for resource configuration according to the resource configuration information;

wherein the resource configuration information comprises DRB identifier information or interface resource information, the DRB identifier information corresponding to the DRB of the UE, and the interface resource information corresponding to the DRB identifier information.

10. The method according to claim 9, further comprising: sending, by the first DBS to the first CBS, a resource configuration response message after the resource configuration is completed according to the resource configuration information.

11. The method according to claim 10, wherein the resource configuration response message identifies the DRB and wherein the resource configuration response message indicates whether the resource was successfully allocated to the DRB.

12. A control base station (CBS), comprising:
a processor, configured to determine resource configuration information for a first data base station (DBS), according to a quality of service (QoS) parameter of a data radio bearer (DRB) of a user equipment (UE) carried in a received resource configuration control instruction sent by a core network, wherein the resource configuration information is used to enable the first DBS to allocate a resource to a DRB of the UE; and
a transmitter, configured to send a first resource allocation indication message to the first DBS, the first resource allocation indication message including the resource configuration information used to enable the first DBS to allocate the resource to the DRB of the UE for resource configuration according to the resource configuration information;
wherein the resource configuration information comprises DRB identifier information or interface resource information, the DRB identifier information corresponding to the DRB of the UE, and the interface resource information corresponding to the DRB identifier information.

13. The CBS according to claim 12, further comprising:
a receiver, configured to receive a first resource configuration response message from the first DBS after completion of the resource configuration according to the resource configuration information.

14. The CBS according to claim 12, wherein the transmitter is further configured to:
send a first resource release indication message to the first DBS to enable the first DBS to release the resource on the DRB for the UE, based on UE identifier information and/or DRB identifier information carried in the first resource release indication message, wherein the DRB identifier information is used to identify the DRB having the resource to be released.

15. The CBS according to claim 12, wherein the transmitter is further configured to:
send a second resource allocation indication message to a second DBS to enable the second DBS to allocate a separate resource to the DRB of the UE; and
in response to receiving a second resource configuration response message from the second DBS after the separate resource to the DRB of the UE is allocated, send a second radio resource control (RRC) reconfiguration instruction to the UE to enable the UE to switch from the first DBS to the second DBS.

16. The CBS according to claim 12, wherein the transmitter is further configured to:
send a switching indication message to a separate CBS to enable the separate CBS to allocate a separate resource to the DRB of the UE; and
in response to receiving a third resource configuration response message from the separate CBS after the separate resource to the DRB of the UE is allocated, send a third RRC reconfiguration instruction to the UE to enable the UE to switch from the CBS to the separate CBS.

17. A data base station (DBS), comprising:
a receiver, configured to receive a resource allocation indication message from a first control base station (CBS), wherein the resource allocation indication message is determined by the CSB according to a quality of service (QoS) parameter of a data radio bearer (DRB) of a user equipment (UE) carried in a received resource configuration control instruction sent by a core network, and the resource allocation indication message carries resource configuration information for a DRB of the UE; and
a processor, configured to allocate a resource to the DRB of the UE for resource configuration according to the resource configuration information;
wherein the resource configuration information comprises DRB identifier information or interface resource information, the DRB identifier information corresponding to the DRB of the UE, and the interface resource information corresponding to the DRB identifier information.

18. The DBS according to claim 17, further comprising:
a transmitter, configured to send, to the first CBS, a resource configuration response message after the resource configuration is completed according to the resource configuration information.

19. The DBS according to claim 17, wherein the processor is further configured to:
in response to receiving a first resource release indication message, release the resource on the DRB for the UE, based on UE identifier information and/or DRB identifier information carried in the first resource release indication message, wherein the DRB identifier information is used to identify the DRB having the resource to be released.

20. The DBS according to claim 17, wherein the processor is further configured to:
in response to receiving a second resource release indication message from the first CBS, release the resource allocated to the DRB of the UE according to the second resource release indication message, wherein the second resource release indication message is sent by the first CBS after receiving a radio resource control (RRC) reconfiguration complete response message from the UE.

21. A method for data radio bearer (DRB) resource configuration, comprising:
determining, by a first control base station (CBS), resource configuration information for a first data base station (DBS), according to a quality of service (QoS) parameter of a data radio bearer (DRB) of a user equipment (UE) carried in a received resource configuration control instruction sent by a core network, wherein the resource configuration information is used to enable the first DBS to allocate a resource to a DRB of the UE;
providing a first resource allocation indication message including the resource configuration information;

sending the first resource allocation indication message to the first DBS;

sending, by the first CBS, a second resource allocation indication message to a second DBS to enable the second DBS to allocate a separate resource to the DRB of the UE based on the second resource allocation indication message;

receiving, at the first CBS, a second resource configuration response message from the second DBS; and sending, by the first CBS, a radio resource control (RRC) reconfiguration instruction to the UE to enable the UE to switch from the first DBS to the second DBS.

22. The method according to claim 21, wherein the RRC reconfiguration instruction comprises at least one of frequency information and pilot information for the second DBS.

23. A method for data radio bearer (DRB) resource configuration, comprising:

determining, by a first control base station (CBS), resource configuration information for a first data base station (DBS), according to a quality of service (QoS) parameter of a data radio bearer (DRB) of a user equipment (UE) carried in a received resource configuration control instruction sent by a core network, wherein the resource configuration information is used to enable the first DBS to allocate a resource to a DRB of the UE;

providing a first resource allocation indication message including the resource configuration information;

sending the first resource allocation indication message to the first DBS;

sending, by the first CBS, a switching indication message to a second CBS to enable the second CBS to allocate a resource to the DRB of the UE;

receiving, at the first CBS, a resource configuration response message from the second CBS; and sending, by the first CBS, a radio resource control (RRC) reconfiguration instruction to the UE to allow the UE to switch from the first CBS to the second CBS.

24. A control base station (CBS), comprising:

a processor, configured to determine resource configuration information for a first data base station (DBS), according to a quality of service (QoS) parameter of a data radio bearer (DRB) of a user equipment (UE) carried in a received resource configuration control instruction sent by a core network, wherein the resource configuration information is used to enable the first DBS to allocate a resource to a data radio bearer (DRB) of the UE; and a transmitter, configured to send a first resource allocation indication message to the first DBS, the first resource allocation indication message including the resource configuration information to enable the first DBS to allocate the resource to the DRB of the UE for resource configuration according to the resource configuration information;

send a second resource allocation indication message to a second DBS to enable the second DBS to allocate a separate resource to the DRB of the UE; and in response to receiving a resource configuration response message from the second DBS after the separate resource to the DRB of the UE is allocated, send a radio resource control (RRC) reconfiguration instruction to the UE to enable the UE to switch from the first DBS to the second DBS.

25. A control base station (CBS), comprising:

a processor, configured to determine resource configuration information for a first data base station (DBS), according to a quality of service (QoS) parameter of a data radio bearer (DRB) of a user equipment (UE) carried in a received resource configuration control instruction sent by a core network, wherein the resource configuration information is used to enable the first DBS to allocate a resource to a data radio bearer (DRB) of the UE; and a transmitter, configured to send a first resource allocation indication message to the first DBS, the first resource allocation indication message including the resource configuration information to enable the first DBS to allocate the resource to the DRB of the UE for resource configuration according to the resource configuration information;

send a switching indication message to a separate CBS to enable the separate CBS to allocate a separate resource to the DRB of the UE; and in response to receiving a separate resource configuration response message from the separate CBS after the separate resource to the DRB of the UE is allocated, send a radio resource control (RRC) reconfiguration instruction to the UE to enable the UE to switch from a current CBS to the separate CBS.

\* \* \* \* \*